United States Patent

[11] 3,619,704

[72] Inventor James W. Schwartz
Western Springs, Ill.
[21] Appl. No. 840,419
[22] Filed July 9, 1969
[45] Patented Nov. 9, 1971
[73] Assignee Warnecke Electron Tuber Inc.
Des Plaines, Ill.

[54] SIGNAL STORAGE TUBE SYSTEM WITH ENHANCED SIGNAL-TO-NOISE RATIO
6 Claims, 9 Drawing Figs.

[52] U.S. Cl. .......... 315/13 ST
[51] Int. Cl. .......... H01j 29/50
[50] Field of Search .......... 315/12, 13, 13 ST

[56] References Cited

UNITED STATES PATENTS

| | | | |
|---|---|---|---|
| 2,508,408 | 5/1950 | Liebson | 315/120 X |
| 2,810,857 | 10/1957 | Williams | 315/12 |
| 2,863,090 | 12/1958 | Young et al. | 315/12 |
| 3,417,335 | 12/1968 | Wilcox | 315/12 X |

*Primary Examiner*—Rodney D. Bennett, Jr.
*Assistant Examiner*—Brian L. Ribando
*Attorney*—Dawson, Tilton, Fallon & Lungmus

ABSTRACT: Alternative systems are disclosed for enhancing the signal-to-noise ratio in a signal storage tube. The intensity of the write beam is amplitude-modulated and it sweeps the target in a vertical raster. The read beam has a constant intensity and sweeps the target in a horizontal raster. In one embodiment, the video signal for one of a predetermined number of write lines is inverted and stored on the target in this inverted form thus translating the frequency band of the read signal to a higher value and out of the frequency range of noise caused by the physical characteristics of the target and the collection optics. In a second embodiment, a signal representative of the background noise is generated and subtracted from the output signal.

PATENTED NOV 9 1971

3,619,704

SHEET 1 OF 2

INVENTOR:

JAMES W. SCHWARTZ

BY

Dawson, Tilton, Fallon & Lungmus

ATT'YS

INVENTOR:
JAMES W. SCHWARTZ
BY
Dawson, Tilton, Fallon & Lungmus
ATT'YS

SIGNAL STORAGE TUBE SYSTEM WITH ENHANCED SIGNAL-TO-NOISE RATIO

BACKGROUND AND SUMMARY

The present invention relates to an image storage tube system wherein information is written on a target area within the storage tube by a higher energy write gun, and the information is retrieved from the target by means of a lower energy read gun.

Image storage tubes of the type with which the present invention is concerned include means for generating and accelerating a beam of electrons toward a target area (herein referred to as an "electron gun") for storing or "writing" information onto the target, The target includes a film of semiconductor material having a first side charged to a uniform potential. The write gun scans the other surface of the semiconductor material to render it partially conductive as a function of the instantaneous energy of the electrons (that is, the potential to which the beam is accelerated).

A lower energy read gun is disposed within the tube in opposing relation to the write gun; and it scans the exposed surface of the target. The target includes a thin film of semiconductor material having on one surface (the surface facing the write gun) a thin metallized film capable of being penetrated by he write gun. Connected to the other side of the metallized film is an electrode comprising a very fine pitch metallic mesh. The mesh electrode is connected to external read circuitry.

The read gun continuously traverses the first surface of the semiconductor material; and as it does so, the energy of the beam is such that it causes electrons on the surface of the semiconductor material to be removed form the material as secondary emission particles; these particles are then collected on an auxiliary collector electrode thereby leaving a net positive charge on the surface of the semiconductor material.

The write beam of the image storage tube is intensity-modulated with the information to be written into the system—that is, the intensity of the write beam is changed as a function of the amplitude of the incoming analog signal desired to be stored in the tube. For example, the incoming information may be a video signal representative of an image.

As the write beam scans its raster, it penetrates the metallized surface of the target as well as the semiconductor film; however, the write beam causes the semiconductor film to become conductive as a function of the intensity of the write beam. For example, under maximum intensity, the conduction will be more effective so as to remove or "drain" the charge off the ummetallized surface of the target area through the semiconductor material to the metallized surface. As the write beam thus scans its raster, the video information is stored on the ummetallized surface of the target semiconductor film wherein a difference in the charge on the surface of the film from its original charge state is representative of the intensity of the image for that elemental area of the target.

The signal information is recovered from the target area by scanning the charged surface of the target with the lower energy read beam. As the read beam traverses an elemental area of the surface which had its uniform charge depleted because of the intensity of the scanning write beam, some electrons will be driven from that area as secondary electrons and collected. This discharge of secondary electrons is sensed at the metallized surface of the target area and coupled to an output amplifier as the recovered signal representative of the stored information.

It will be appreciated that a number of physical, chemical and electronic parameters play an important part in the operation of the system. Thus, for example, if the thickness of the semiconductor film of the target is not uniform, he writing beam will more easily penetrate the semiconductor film and a relatively less intense signal may deplete different amounts of charge from the exposed surface of the target than he same intensity beam would deplete from an area in which the film were thicker. As explained in greater detail within, this type of variation in the thickness of the target film (as well as other physical or chemical properties of the target and collection optics) may cause a low-frequency variation in the amplitude of the recovered signal, which variation is a function of the physical parameters of the target or the collection optics and not a function of the information contained in the incoming video signal. Thus, this undesirable signal causes a "noise" to be present in the recovered signal which was not present in the incoming signal. The frequency of the noise signal is a function of the scan rate of the read gun. Other system parameters that might produce undesirable variations in the recovered (or read) signal include variations in the collector efficiency, changes in the scan angles, variations in the surrounding electrical field, and so on. Thus, there are a number of aspects in the collection optics and dimensional and chemical characteristics of the system that may cause a noise signal having a fundamental frequency equal to the scan rate of the read gun.

In its broader aspects, the present invention eliminates the type of low frequency noise signal resulting from the above causes by translating the written information to a much higher frequency range by modifying the characteristic of the write operation. When the information is recovered from the signal storage tube, the low-frequency noise signal is filtered from the recovered signal; and the original signal is then reconstituted free of the low-frequency noise.

In one embodiment of the invention, the polarity of the modulated intensity of the "write" information on one of a predetermined number of a cyclic group of write scan lines is inverted. That is, the total number of write scan lines is divided into a number of groups (which may range in number of lines per group from two through 10, for example); and the incoming video signal for one of the scan lines of the group is fed to an inverting amplifier before it is stored on the target In a preferred embodiment, every other line in the write cycle is inverted in this manner. As will be disclosed more fully within, a low-frequency incoming video signal is thus transformed so that a high-frequency signal is recovered when the target is read. The read signal contains the low-frequency noise signal caused by tube imperfections as well as high-frequency component representative of the translated original information signal. By passing the output signal through a high pass filter, the low-frequency noise signal caused by the target imperfections is eliminated; and the original signal thereafter is freed from adulteration by the noise signal. The signal may be transformed back to its original low-frequency format where this is desirable.

In an alternative embodiment, which has application in certain information processing systems, the incoming video signal is stored directly on the target; and the read signal is recovered directly. The lower frequency components of the read signal are then circulated through a delay loop having a delay time equal to the scan time of the read deflection circuitry. Then, the integrated output of the delay loop is correlated with subsequent read scan line so as to subtract the low-frequency background signal from the recovered signal thereby eliminating the noise.

Thus, the present invention generally enhances the overall low frequency signal-to-noise ratio of an image storage tube system and renders the recovered signal substantially free of low-frequency noise caused by imperfections in the target and associated electron optics of the tube. Other features and advantages of the present invention will be apparent to persons skilled in the art from the following detailed description of a preferred embodiment accompanied by the attached drawing.

THE DRAWING

Figures 1, 2, 3, 4, 5, 9:
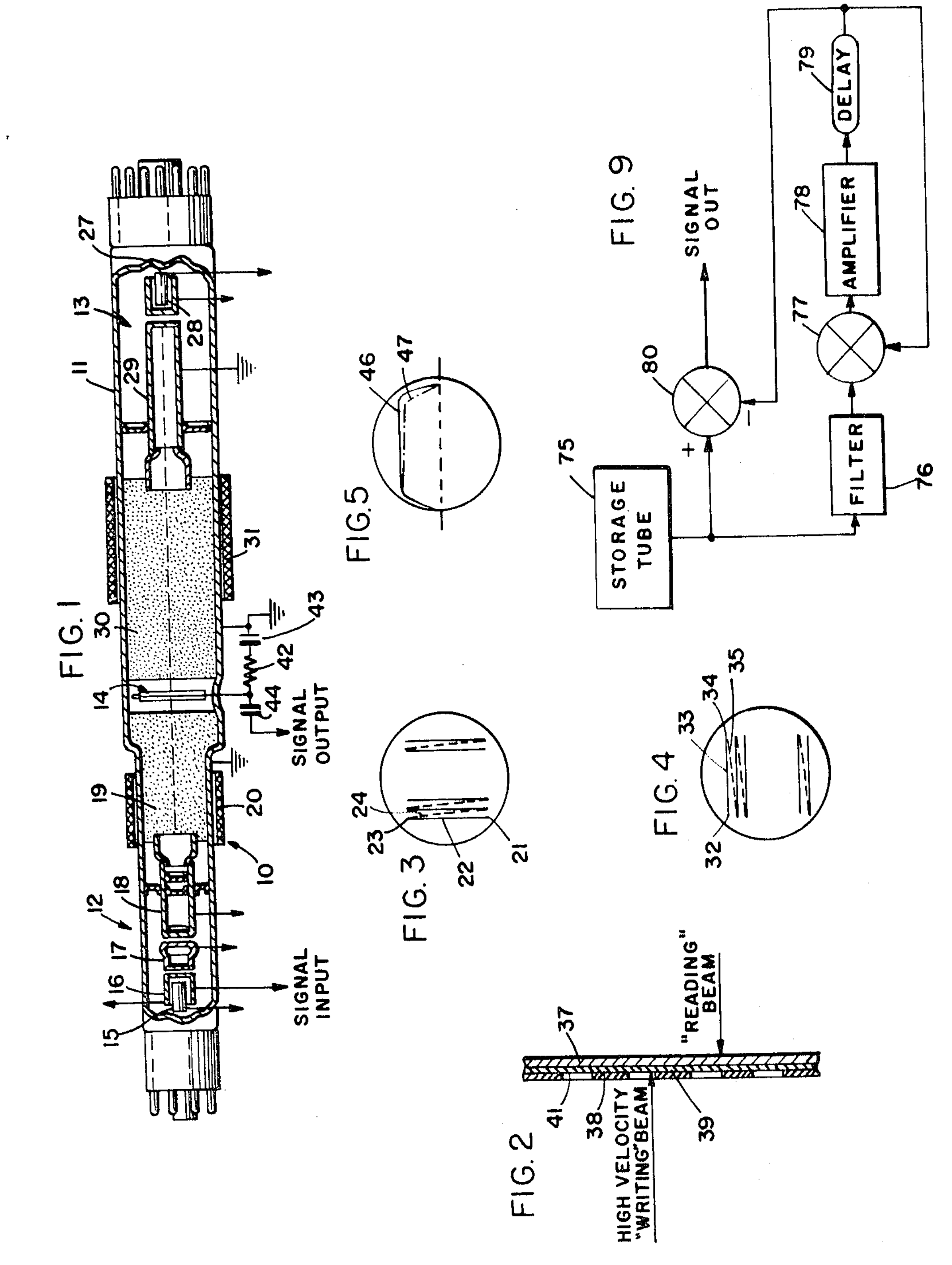
FIG. 1 is a partially sectioned view of a signal storage tube incorporated in the inventive system.
FIG. 2 is a detailed view of an elemental portion of the target in cross section.
FIGS. 3–4 show respectively he read scan and write scan.
FIG. 5 illustrates an idealized and a typical response for a storage tube.
Figure 6:
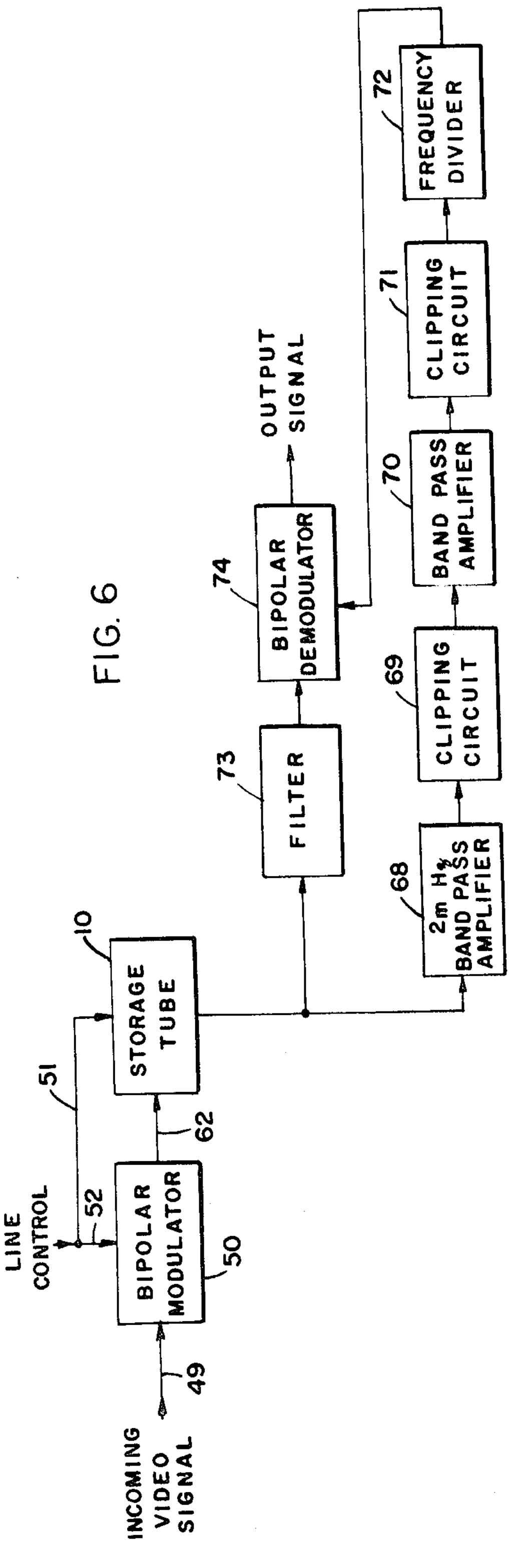

In assembling grid electrode 7 shown in FIG. 4*a* with the anode electrode shown in FIG. 5, projections 14' are fitted in guide openings 14 is above described to bring grid electrode 7 close to the insulating substrate 2 thus providing an assembly as shown in FIG. 6. Filament 6 is then mounted to extend in front of the assembly and lead wires are connected to respective electrodes. The assembly is then sealed in the glass envelope 9 to complete the fluorescent tube shown in FIG. 3.

As above described the function of a control grid that controls the divergence and flow of electrons and that of a screen grid electrode that collects the substances evaporated from fluorescent anode segments and secondary electrons emanated therefrom are provided by a single grid electrode. As a result, the number of electrodes is decreased by one thus providing an inexpensive fluorescent display tube wherein electrodes can be assembled readily.

The grid electrode employed in this invention has a window of a configuration of a pattern comprised by all fluorescent segments on an insulating substrate and a mesh is formed in the window. Furthermore, different from a prior screen grid, as there is no bridge in the window corresponding to and aligning with the insulating bridges between segments on the insulating substrate, it is not necessary to take care to align the window with the insulating bridge on the insulating substrate, thus rendering easy assembling. This construction also eliminates the provision of a control grid between the screen grid and the filament which was essential to the prior construction so that it becomes possible to dispose the filament closer to the anode electrode thus flattening and miniaturizing the display tube. The cutoff characteristics of the novel display tube has been improved about 30 percent over the prior fluorescent display tube.

What is claimed is:

1. A fluorescent display tube comprising an evacuated sealed envelope, an insulating substrate within said envelope, an anode electrode including a plurality of fluorescent anode segments adapted to form characters, said anode segments being mounted on said insulating substrate and insulated from each other, a single grid electrode disposed close to said anode segments, and a cathode filament extending in front of said grid electrode, said grid electrode being provided with a window common to the region of a pattern formed by said plurality of fluorescent anode segments, said window being provided with an electroconductive mesh.

2. The fluorescent display tube according to claim 1 wherein said grid electrode comprises a metal plate provided with a window of a configuration corresponding to a pattern formed by all segments of a character to be displayed and a metal mesh provided for said window and wherein said anode comprises a plurality of fluorescent anode segments embedded in said insulating substrate and insulated from each other, said anode segments being arranged to be combined to display a desired character or digit and wherein said grid electrode and said anode electrode are assembled together.

3. The fluorescent display tube according to claim 1 wherein said grid electrode and said substrate are connected together by means of interfitting projections and openings.

* * * * * straight line of constant amplitude as indicated by the solid line 46 in FIG. 5. However, because of variations in the electron collection efficiency in the target region or of variations in the properties of the semiconductor film, the charge generated on the exposed surface of the semiconductor film will be slightly less for that side of the target even though the intensity of the write beam has not diminished. Thus, when the read beam scans the same elemental line, the readout voltage will be that shown in FIG. 5 by the chain line 47. As the read gun scans the target at its predetermined scan rate, this effect will cause a low-frequency noise signal to be added to the read out which had not been present in the signal written into the target. The fundamental frequency component of this noise voltage is the reciprocal of the read scan time for a single line in the read raster. In the example given, for a read line scan time of 50 microseconds, the fundamental frequency for this noise is 20 kHz. This noise frequency appears at the lower end of the video band, nevertheless, it appears within the video band so that there may be appreciable signal levels at this same frequency; and it becomes impossible to distinguish between the signal and the noise for this fundamental frequency and the first four or five harmonics thereof.

Turning now to FIG. 6, the storage tube is schematically illustrated within the block 10; and the incoming video signal is received on a line 49 and fed through a bipolar modulator 50 to the control grid 16 (FIG. 1) of the storage tube. The line control voltage which determines the horizontal location of the vertical scan lines in the write deflection yoke 20 along a line 51 and to the bipolar modulator along a line 52.

Figure 7:
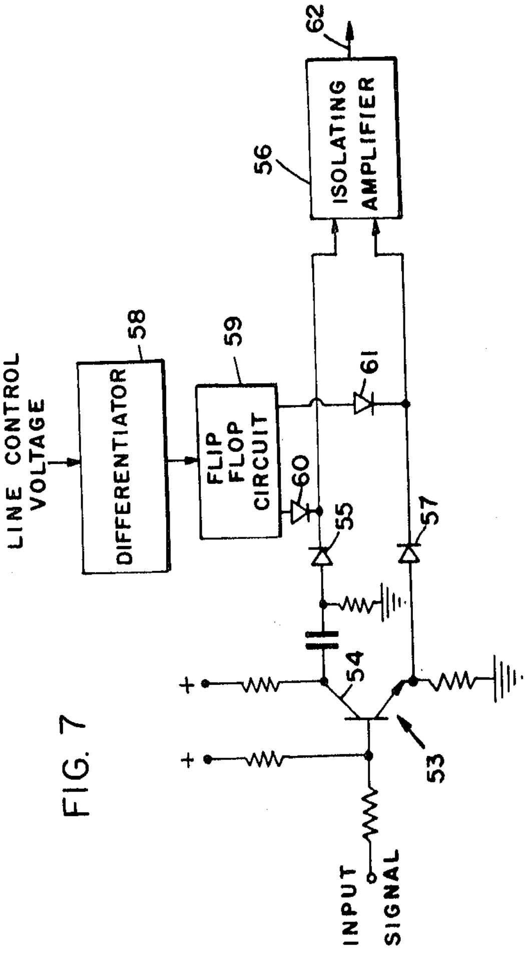

The function of the bipolar modulator 50 is to invert the polarity of the incoming video signal for a given number of lines of a group of vertical raster lines in a write frame. In the illustrated embodiment, the inversion takes place for alternate lines. One form which the bipolar modulator 50 may take is shown in FIG. 7 which includes a conventional transistor amplifier generally designated 53 and including a transistor 54 biased as a linear amplifier. The input signal is fed to the base of the transistor 54 so that the output signal taken from the emitter is the same as the output signal taken from the collector except that it is inverted. The output signal from the collector is fed through a diode 55 to one input of an isolating amplifier 56; and the output signal taken from the emitter of transistor 54 is fed through a diode 57 to a second input of the isolating amplifier 56. The line control voltage is fed to a differentiator 58 to produce a spike or impulse at the end of each line. This spike or impulse is fed to a flip-flop circuit 59 which is arranged so as to change its output state for each received impulse.

One the outputs of the flip-flop circuit 59 is coupled through a diode 60 to the cathode of the diode 55; and the other output of the flip-flop circuit 59 is coupled by means of a diode 61 to the cathode of the diode 57. Thus, during one line scan, the flip-flop circuit has one output which is relatively high in voltage to forward bias the diode 60 thereby reverse biasing the diode 55. At the same time, the other output of the flip-flop circuit is relatively low thereby forward biasing the diode 57 and permitting the signal from the emitter of the linear amplifier 53 to be fed to the isolating amplifier 56. At the end of that line, a signal is received on the line control voltage which is fed through differentiator 58 to change the state of the flip-flop circuit 59; and for the next line, the signal received by the isolating amplifier 56 is that from the collector of the transistor 54.

Thus, the output of the isolating amplifier 56 is fed along a line 62 to the control grid of the write gun of the storage tube 10. Thus, the incoming video signal is stored on the target of the storage tube of correct polarity for one vertical scan line of the write frame and of reverse polarity (or inverted) relative to some DC base line for the succeeding scan line of the write frame.

Figure 8:
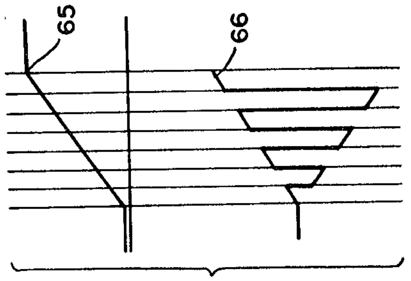

The effect of alternately inverting the polarity of the incoming video signal is to translate the low-frequency components to high-frequency read out signals. For example, for the linearly increasing portion of an incoming video wave form indicated by the reference numeral 65, successive scan lines are indicated by the vertical lines in FIG. 8. The inverted low-frequency signal will be translated to the lower representation in the diagram designated by reference numeral 66 which is seen to have much higher frequency components than the original waveform 65.

In recovering the original signal, a timing signal is generated which can be used to demodulate the recovered signal. Thus, a 2 mHz band pass amplifier 68 receives the recovered signal output from the storage tube 10 and feeds it to a clipping amplifier 69 which clips the output signal from the bandpass amplifier 68. The bandpass amplifier 68 is turned cutoff a cutoff resonant frequency of 2 megahertz.

A second bandpass amplifier 70 receives the output of the clipping circuit 69 and feeds it to a second clipping circuit 71; and the output of the second clipping circuit is a 2 mHz. sine wave which is synchronized with the alternate switching of the output signal of the tube. The output of the clipping circuit 71 is then fed to a frequency divider 72 which divides the 2 mHz. frequency by a factor of 2 to produce a continuous 1 megahertz signal. The output signal recovered from the storage tube 10 is also fed through a high-pass filter 73 which rejects the 20 kilohertz noise signal and its lower harmonies. The filtered signal is fed into a bipolar demodulator 74 which performs the converse function of a previously described bipolar demodulator 50—namely, it generates an output signal of a single polarity for the period of time required to read one scan line of information written into the storage tube. For the next period of time, the bipolar demodulator 74 inverts the polarity of the recovered signal to reconstruct the original incoming video signal. Thus, in the inventive system, the polarity of the write video is inverted in timed relation to the write scan line period and the polarity of the recovered signal is inverted at a rate in timed relation to read element rate (that is, the time between the read beams's traversing adjacent of the orthogonal write elements). That is to say, for a predetermined group of vertical scan or write lines, one or more of that group is recorded in inverted polarity. This translates all of the information of low-frequency components to a very much higher frequency and thus avoids the signal band containing low-frequency noise caused by the scanning of an imperfectly formed target or imperfect collection optics.

By doing this a DC waveform is translated into a one megahertz signal. Similarly, a 40 kilohertz signal will be translated to 0.96 megahertz and an 80 kilohertz signal is translated to 0.92 megahertz. In general, if $f_0$ is the frequency of the read video signal that would exist in a prior art system, and $f'$ is the frequency of switching for the read gun, then the translated frequency $f$ is given by the formula below:

$$f=f'-f_0$$

In an alternative embodiment, the received signal coming from the target of the storage tube 75 (FIG. 9) is passed through a low-pass filter 76 to suppress the high-frequency components; and it is then passed through a summing junction 77, an amplifier 78 and a delay line 79 having a delay time equal to the read scan time. In the example above, the delay line is 500 microseconds. The signal coming out of the delay line 79 is then added to the output signal from the suppression filter 76; and it is put through the delay line again. The gain of the feedback loop is slightly less than one, for example 0.9. Then, assuming there is no particular correlation between video signal information on one line and that which is on succeeding lines the effect is to average information on succeeding lines through the delay line.

The information signal, hence, will average out to zero, whereas the background noise (which repeats itself generally for successive lines) will be cumulative. In other words, the noise will correlate whereas the signal in many applications will not correlate. Therefore, the correlated noise signal is subtracted in line sequence with the recovered signal by combining the two in the junction 80. Therefore, the background noise signal is subtracted from the output signal of the storage tube.